United States Patent [19]

Lindgren

[11] Patent Number: 4,813,636
[45] Date of Patent: Mar. 21, 1989

[54] ANTI-FOULING TUBE FOR AN INFLATION-CONTROL LINE ON A PARACHUTE

[75] Inventor: Matts J. Lindgren, Cupertino, Calif.
[73] Assignee: Lockheed Missiles & Space Company, Inc., Sunnyvale, Calif.
[21] Appl. No.: 34,253
[22] Filed: Apr. 6, 1987
[51] Int. Cl.⁴ .............................................. B64D 17/02
[52] U.S. Cl. .................................................. 244/152
[58] Field of Search .............................. 244/142, 152
[56] References Cited

U.S. PATENT DOCUMENTS 3,393,885 7/1968 Neumark ............................ 244/152
4,524,930 6/1985 Lindgren et al. .................... 244/152

FOREIGN PATENT DOCUMENTS 912299 12/1962 United Kingdom ................ 244/152

Primary Examiner—Galen Barefoot
Attorney, Agent, or Firm—John J. Morrissey

[57] ABSTRACT

An inflation-controlled parachute comprises a canopy (10) for providing an aerodynamic drag-producing surface, and an inflation-control line (21) for controlling the rate at which the canopy (10) unfolds from a stowed configuration to an inflated configuration. The inflation-control line (21) is threaded through an anti-fouling tube (20) attached to the canopy (10). When the canopy (10) is in the stowed configuration, the inflation-control line (21) overlaps itself within the anti-fouling tube (20). As the canopy (10) unfolds to the inflated configuration, overlapping portions of the inflation-control line (21) slide against each other and against an inner surface of the anti-fouling tube (20). Frictional engagement of the overlapping portions of the inflation-control line (21) with each other and with the inner surface of the anti-fouling tube (20) provides resistance to the unfolding of the canopy (10), thereby controlling the rate of inflation of the canopy (10).

1 Claim, 3 Drawing Sheets

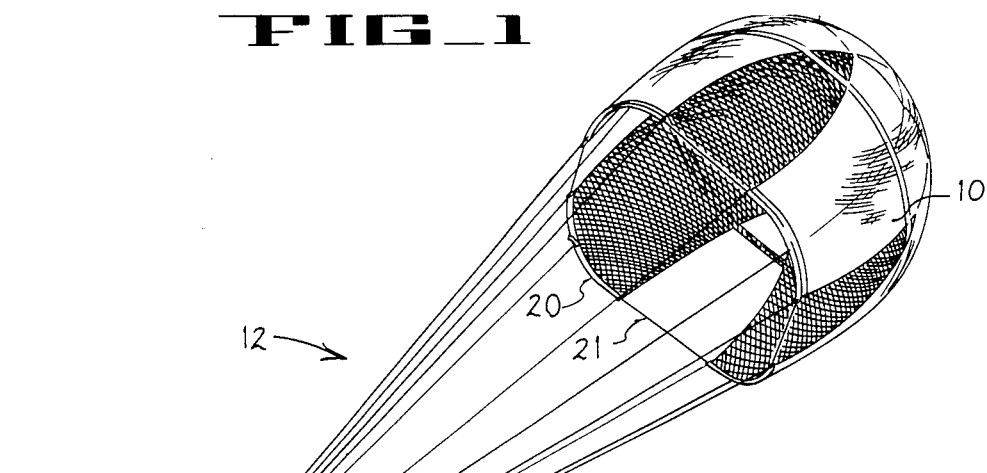
FIG_1
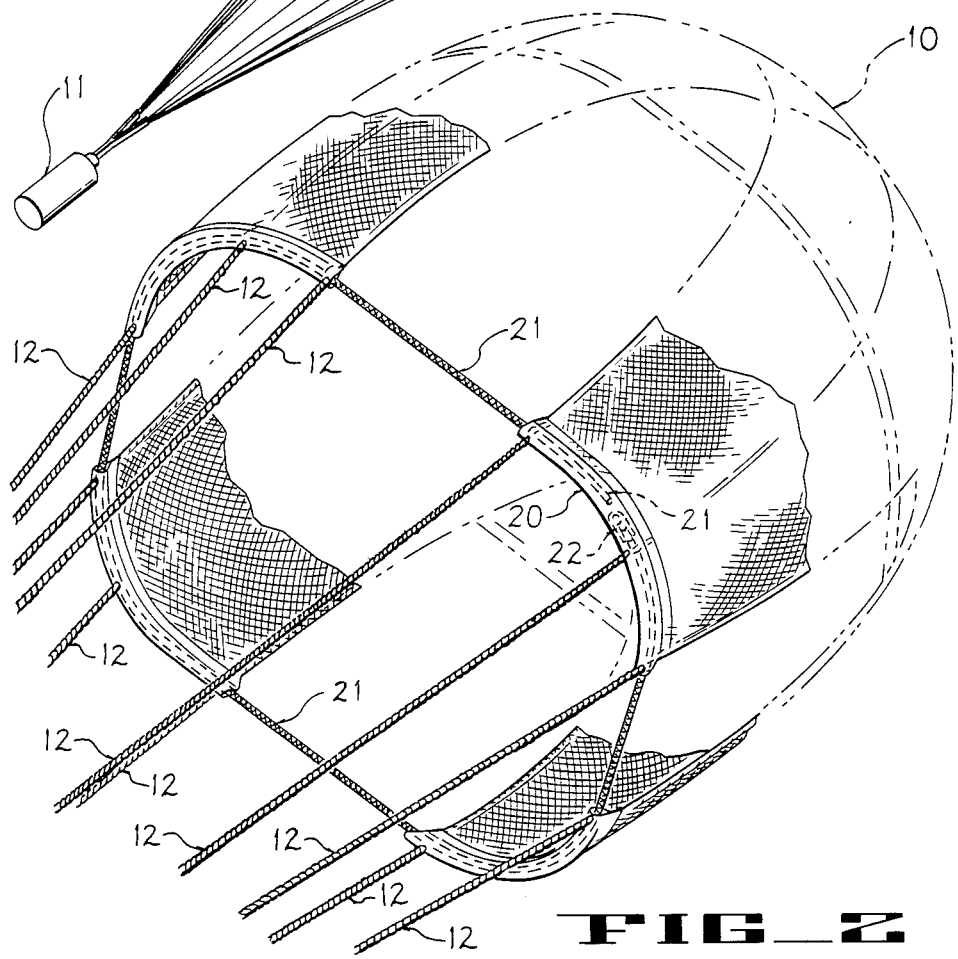
FIG_2

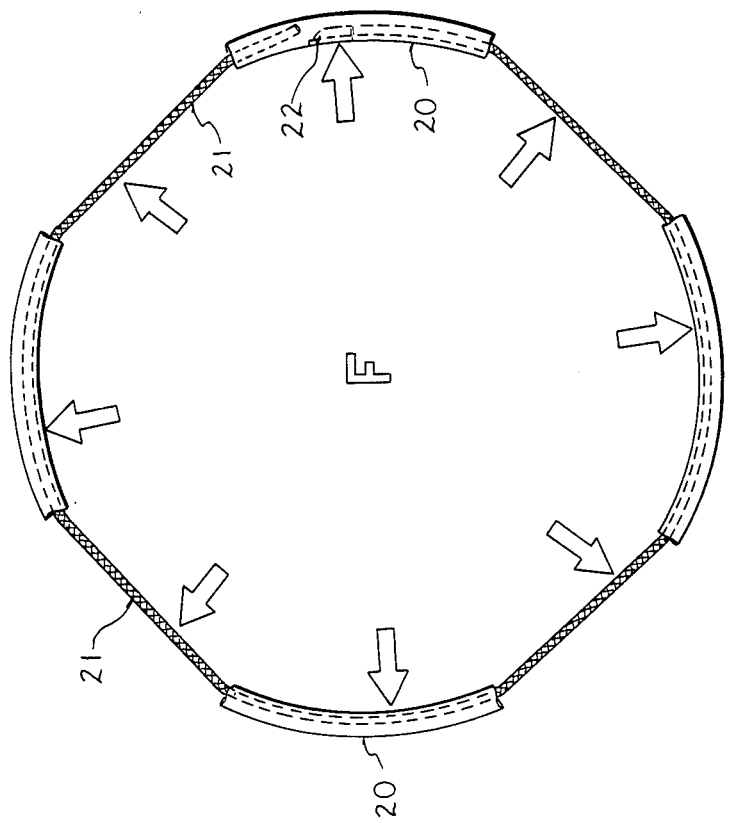
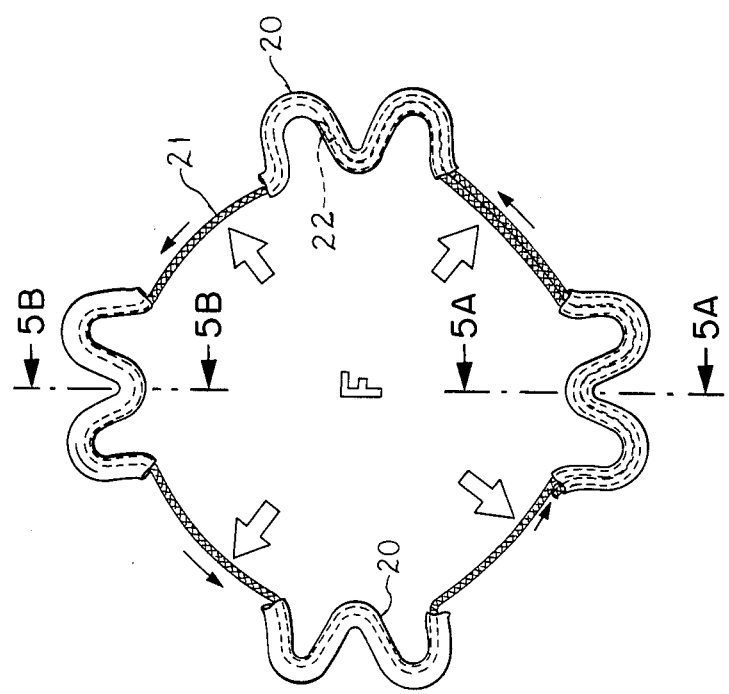

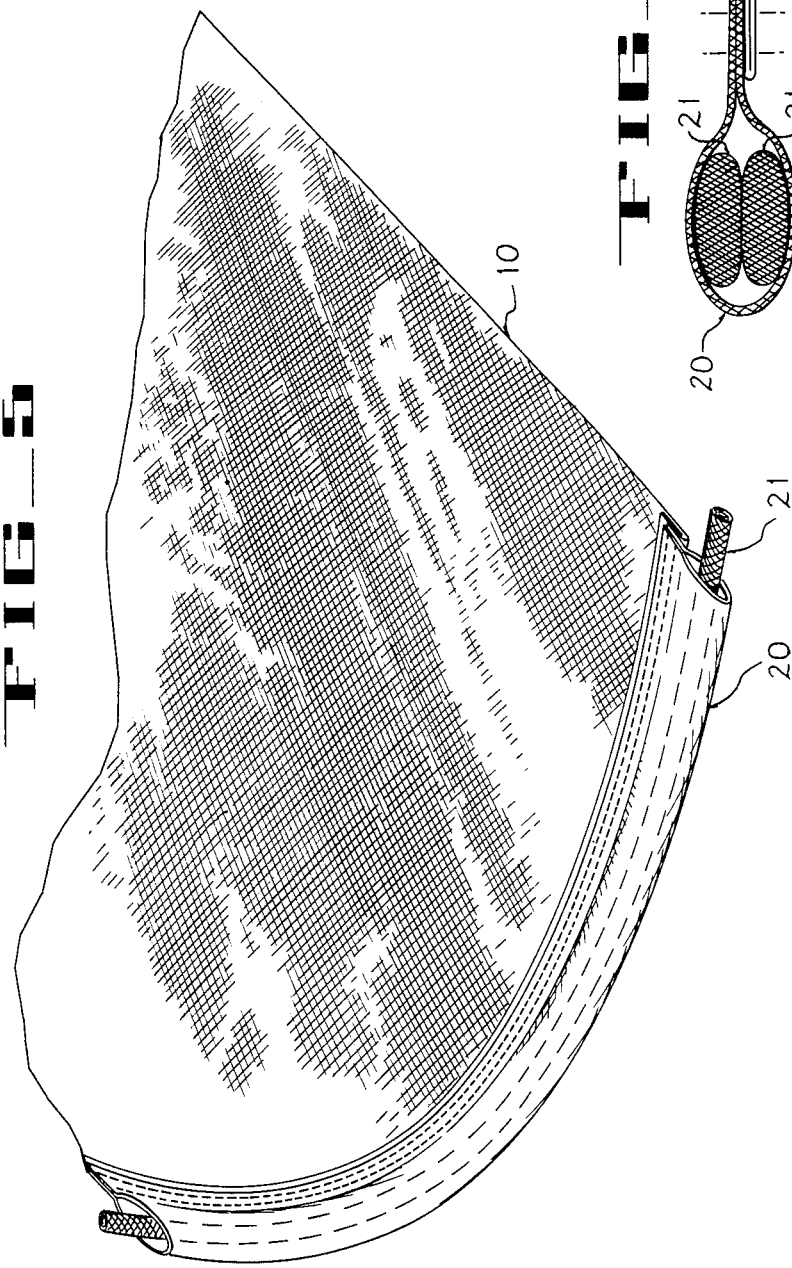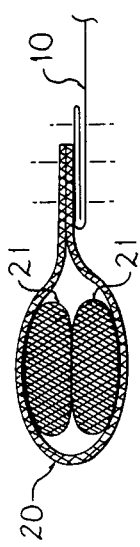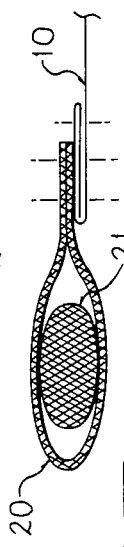

ANTI-FOULING TUBE FOR AN INFLATION-CONTROL LINE ON A PARACHUTE

TECHNICAL FIELD

This invention relates to a technique for controlling the rate of inflation of a parachute canopy.

DESCRIPTION OF THE PRIOR ART

U.S. Pat. No. 4,524,930 describes a technique for controlling the rate of inflation of a parachute canopy from a folded (i.e., stowed) configuration to an unfolded (i.e., inflated) configuration so that inflation of the canopy occurs continuously at a predetermined rate.

In accordance with the technique described in U.S. Pat. No. 4,524,930, one end of an inflation-control line is secured to a portion of the parachute canopy (e.g., to an inside surface portion of the canopy adjacent the periphery thereof), and the other end of the inflation-control line is threaded through positioning rings attached to the canopy so that one portion of the inflation-control line overlaps another portion thereof when the canopy is in the stowed configuration. As the canopy unfolds to the inflated configuration when the parachute is deployed, frictional contact occurs between overlapping portions of the inflation-control line as one portion is made to slide over the other. The frictional contact between overlapping portions of the inflation-control line provides resistance to inflation of the canopy, and thereby controls the rate at which the canopy is inflated.

SUMMARY OF THE INVENTION

The technique described in U.S. Pat. No. 4,524,930 for controlling the rate of inflation of a parachute canopy was developed for a particular application to facilitate delivery by parachute of an inanimate and rather rugged payload from an aircraft or rocket travelling at a high velocity.

Subsequent research to consider the suitability of the technique described in U.S. Pat. No. 4,524,930 for other applications has indicated that aerodynamic effects associated with canopy inflation (e.g., flutter of the canopy surface and/or of the suspension lines) might, under certain circumstances, result in:

(a) separation of overlapping portions of the inflation-control line from contact with each other at positions between the positioning rings attached to the canopy; and/or (b) entanglement of the inflation-control line with itself, and/or with one or more of the suspension lines, and/or with a portion of the canopy.

If overlapping portions of the inflation-control line were to become separated from contact with each other during inflation of the canopy of a parachute as described in U.S. Pat. No. 4,524,930, the rate of inflation of the canopy would correspondingly increase due to the resulting decrease in frictional resistance to canopy inflation. Under certain circumstances, the increase in the rate of canopy inflation could become so great that forces exerted on the payload during canopy inflation would exceed tolerable limits.

If the inflation-control line were to become entangled with itself, or with a suspension line, or with a portion of the canopy, the canopy might thereby be prevented from achieving full inflation, in which case the rate of descent of the parachute would correspondingly increase. Under certain circumstances, the increase in the rate of descent of the parachute could become excessive for safety of the payload.

It is difficult to quantify precisely how much separation of overlapping portions of the inflation-control line from contact with each other, or precisely how much entanglement of the inflation-control line with itself, or with one or more of the suspension lines, or with a portion of the canopy, could be tolerated for a particular application. However, it is apparent that for many applications an excessive rate of canopy inflation, or an excessive rate of descent, would have a catastrophic effect on the payload.

It is an object of the present invention to provide a technique for minimizing the possibility of separation from contact with each other of overlapping portions of the inflation-control line of a parachute as disclosed in U.S. Pat. No. 4,524,930 during inflation of the parachute canopy.

It is also an object of the present invention to provide a technique for minimizing the possibility of fouling of the inflation-control line on itself, and/or on the payload suspension lines, and/or on the canopy of a parachute of the type disclosed in U.S. Pat. No. 4,524,930 during inflation of the canopy.

In accordance with the present invention, a parachute of the type disclosed in U.S. Pat. No. 4,524,930 is modified so that the positioning rings through which the inflation-control line is threaded are replaced by an anti-fouling tube attached to the canopy. One end of the inflation-control line is attached to the canopy, and the other end (i.e., the free end) is threaded through the anti-fouling tube (instead of through positioning rings as described in U.S. Pat. No. 4,524,930).

When the canopy of a parachute according to the present invention is in the stowed configuration, one portion of the inflation-control line overlaps another portion thereof within the anti-fouling tube. As the canopy unfolds to the inflated configuration during deployment of the parachute, the overlapping portions of the inflation-control line slide against each other and against the inner surface of the anti-fouling tube, thereby providing frictional resistance to inflation of the canopy. For a given coefficient of friction of the material (or materials) from which the inflation-control line and the anti-fouling tube are made, the frictional resistance to inflation of the canopy can be predetermined by adjusting the amount of overlap of the overlapping portions of the inflation-control line within the anti-fouling tube.

Use of an anti-fouling tube according to the present invention provides an improvement over the inflation-control technique described in U.S. Pat. No. 4,524,930 in that:

(a) The anti-fouling tube confines the inflation-control line so as to prevent the inflation-control line from fouling on itself, or on any of the suspension lines, or on the canopy; and (b) The anti-fouling tube provides an additional frictional surface (viz., the inner surface of the tube) against which the inflation-control line can frictionally slide as the canopy is being inflated, thereby refining the ability of the parachute designer to control the rate of inflation of the canopy.

DESCRIPTION OF THE DRAWING

FIG. 1 is a perspective view of a particular embodiment of a parachute according to the present invention in which an inflation-control line is confined within a segmented anti-fouling tube.

FIG. 2 is a portion of the perspective view of FIG. 1 in which the segments of the anti-fouling tube are shown in enlarged detail.

FIG. 3 is a plan view showing overlapping portions of the inflation-control line within the anti-fouling tube of the parachute of FIG. 1 at an intermediate stage of canopy inflation.

FIG. 4 is a plan view showing the inflation-control line within the anti-fouling tube of the parachute of FIG. 1 after the canopy has become fully inflated.

FIG. 5 is a fragmentary perspective view of a portion of the canopy of the parachute of FIG. 1 showing the inflation-control line within the anti-fouling tube.

FIG. 5A is a cross-sectional view along line 5A—5A of FIG. 3.

FIG. 5B is a cross-sectional view along line 5B—5B of FIG. 3.

BEST MODE FOR CARRYING OUT THE INVENTION

FIG. 1 illustrates an inflation-controlled parachute according to the present invention after having been deployed from a delivery vehicle, e.g., an aircraft or a rocket, which may be travelling at a supersonic velocity. The parachute comprises a flexible canopy 10 to which a payload 11 is secured by means of suspension lines 12.

Upon deployment of the parachute from the delivery vehicle, the canopy 10 begins to unfold from a stowed configuration to an inflated configuration. Typically, the canopy 10 unfolds into a generally dome-like inflated configuration having a generally circular periphery to which proximal ends of the suspension lines 12 are attached. In the embodiment illustrated in FIG. 1, the canopy 10 has four symmetrically arranged leg portions, which extend from a central apex portion and are separated from each other by generally triangular gores. However, the particular configuration of the canopy 10 is not critical to the present invention.

The proximal ends of the suspension lines 12 are attached to the periphery of the leg portions of the canopy 10 by a conventional technique (e.g., by sewing). The canopy 10 would typically be made of a synthetic fabric such as nylon, and the suspension lines 12 could be nylon cords. However, the canopy 10 and the suspension lines 12 could be made from a wide variety of different materials selected to meet special requirements of particular applications. Distal ends of the suspension lines 12 are secured to the payload 11 by conventional means. In accordance with the present invention, an anti-fouling tube 20 is secured to the canopy 10, preferably to an inside surface portion of the canopy 10 adjacent the periphery thereof.

In the embodiment shown in FIG. 1, the anti-fouling tube 20 comprises four discontinuous segments attached (as by sewing) to the four corresponding leg portions of the canopy 10. In an alternative embodiment, the anti-fouling tube 20 could be an unsegmented tube that is closed upon itself. The anti-fouling tube 20 would ordinarily be unsegmented for a large parachute without leg portions, in which case the anti-fouling tube 20 would be attached all around the inside periphery of the canopy 10. If the canopy has leg portions (as shown in FIG. 1), the anti-fouling tube 20 could be either segmented (as shown in FIG. 1) or unsegmented. If the anti-fouling tube 20 is segmented, the individual segments thereof would be attached to the inside peripheries of corresponding leg portions of the canopy 10. If the anti-fouling tube 20 is unsegmented but used with the type of canopy 10 shown in FIG. 1 (i.e., with gores), the anti-fouling tube 20 would be attached to the inside peripheries of the corresponding leg portions of the canopy 10 and would extend across the gores intervening between the leg portions.

Regardless of whether the anti-fouling tube 20 is segmented or unsegmented, an inflation-control line 21 is threaded therethrough so that one portion of the inflation-control line 21 overlaps another portion thereof when the canopy 10 is in the stowed configuration. If the anti-fouling tube 20 is unsegmented, an entrance slit is provided on the surface thereof to permit entry of the inflation-control line 21 therein.

As shown in FIG. 2, a first end 22 of the inflation-control line 21 is secured to the canopy 10, and the other end (i.e., the free end) thereof is threaded through the anti-fouling tube 20. The diameter of the anti-fouling tube 20 is dimensioned so that the inflation-control line 21 can be doubled around over itself within the anti-fouling tube 20 (or within one or more segments thereof) with a tight frictionally engaging fit against the inner surface of the anti-fouling tube 20, when the canopy 10 is in the stowed configuration. The anti-fouling tube 20 is made of a material that does not fuse with the material of which the inflation-control line 21 is made when the inflation-control line 21 frictionally engages the inner surface of the anti-fouling tube 20 during sliding contact therebetween.

When the parachute is initially deployed, while the canopy 10 is still folded in the stowed configuration, one portion of the inflation-control line 21 overlaps another portion thereof to a maximum extent. As the canopy 10 begins to unfurl, opening forces (which are indicated by vectors F shown in FIGS. 3 and 4) cause the canopy 10 to billow and the leg portions thereof to spread apart. The spreading of the leg portions of the canopy 10 causes the inflation-control line 21 to change from the initial condition of maximum overlap upon itself, through constantly varying intermediate conditions (as illustrated in FIG. 3 for a particular instant in time) during which the extent of overlap is continuously decreasing, to a final condition (as illustrated in FIG. 4) in which the extent of overlap of the overlapping portions of the inflation-control line 21 is reduced to a minimum. Minimum overlap of one portion of the inflation-control line 21 upon another portion thereof could be zero overlap, depending upon the length of the inflation-control line 21 relative to the full circumference of the anti-fouling tube 20 at maximum inflation of the canopy 10. The anti-fouling tube 20 has a sufficient length (i.e., circumference) so as not to restrict full inflation of the canopy 10.

As the inflation-control line 21 changes from its initial condition (corresponding to the stowed configuration of the canopy 10) to its final condition (corresponding to full inflation of the canopy 10), the concomitant change in the extent of overlap of the inflation-control line 21 upon itself takes place inside the anti-fouling tube 20. Thus, the overlapping portions of the inflation-control line 21 are confined in contact with each other, and all portions of the inflation-control line 21 are prevented from making contact with the canopy 10 or the suspension lines 12, during inflation of the canopy 10.

In FIG. 5, the inflation-control line 21 is shown confined within the anti-fouling tube 20, after the canopy 10 has become fully inflated. A cross-sectional view of the inflation-control line 21 doubled around upon itself within the anti-fouling tube 20 when the canopy 10 is in the stowed configuration is shown in FIG. 5A. A corresponding cross-sectional view of the inflation-control line 21 within the anti-fouling tube 20 after the canopy 10 has become fully inflated is shown in FIG. 5B. The parachute designer achieves control of the rate of inflation of the canopy 10 by selecting the material (or materials) for the anti-fouling tube 20 and for the inflation-control line 21 to have an appropriate coefficient of friction, and by adjusting the extent of overlap of the overlapping portions of the inflation-control line 21 when the canopy 10 is in the stowed configuration, so that the desired frictional resistance to inflation of the canopy 10 is obtained.

A particular embodiment of a parachute having an inflation-control line confined within an anti-fouling tube in accordance with the present invention has been described and illustrated herein. Other embodiments suitable for particular applications would become apparent to workers skilled in the art upon perusal of the foregoing specification and accompanying drawing. Thus, the description presented herein is to be understood as illustrative of the invention, which is more generally defined by the following claims and their equivalents.

I claim:
1. A parachute comprising:
   (a) a flexible canopy that is foldable into a stowed configuration, said canopy being unfoldable from said stowed configuration into an inflated configuration so as to provide an aerodynamic drag-producing surface; and
   (b) inflation control means for enabling said canopy to unfold from said stowed configuration into said inflated configuration at a controlled rate, said inflation control means including:
      (i) a flexible tube attached lengthwise to a peripheral portion of said canopy; and
      (ii) a flexible inflation-control line, a first end of said inflation-control line being attached to said canopy, a second end of said inflation-control line being threaded through said flexible tube so that a first portion of said inflation-control line overlies a second portion of said inflation-control line within said flexible tube when said canopy is folded in said stowed configuration, and so that said first and second portions of said inflation-control line are in frictional engagement with each other and with an inner surface of said flexible tube when said first portion of said inflation-control line moves relative to said second portion of said inflation-control line, relative motion of said first portion of said inflation-control line with respect to said second portion of said inflation-control line occurring when said canopy unfolds into said inflated configuration, said frictional engagement of said first and second portions of said inflation-control line with each other and with said inner surface of said flexible tube providing frictional resistance for controlling the rate at which said canopy unfolds into said inflated configuration, said second end of said inflation-control line being confined within said flexible tube when said canopy is in said inflated configuration.

* * * * *